United States Patent [19]

Briggs et al.

[11] Patent Number: 4,959,405
[45] Date of Patent: Sep. 25, 1990

[54] ACID MODIFIED ADHESIVE COMPOSITION

[75] Inventors: Paul C. Briggs, Charlestown; Donald E. Gosiewski, Peabody, both of Mass.

[73] Assignee: Illinois Tool Works, Inc.

[21] Appl. No.: 361,749

[22] Filed: Jun. 2, 1989

Related U.S. Application Data

[60] Continuation of Ser. No. 135,012, Dec. 18, 1987, abandoned, which is a division of Ser. No. 870,710, Jun. 4, 1986, Pat. No. 4,714,730.

[51] Int. Cl.$^5$ ................................................ C08K 5/09
[52] U.S. Cl. ...................................... 524/321; 524/300
[58] Field of Search ........................... 525/72, 78, 80; 524/321, 300

[56] References Cited

U.S. PATENT DOCUMENTS

| | | | |
|---|---|---|---|
| 3,868,433 | 2/1975 | Bartz et al. | 525/72 |
| 4,339,365 | 7/1982 | Becker et al. | 526/265 |
| 4,387,188 | 6/1983 | Statz | 525/72 |
| 4,451,617 | 5/1984 | Khae | 525/72 |
| 4,536,546 | 8/1985 | Briggs | 525/83 |
| 4,632,959 | 12/1986 | Nagano | 525/72 |

*Primary Examiner*—Joseph L. Schofer
*Assistant Examiner*—N. Sarofim
*Attorney, Agent, or Firm*—Herbert P. Price

[57] ABSTRACT

It has been discovered that by adding one or more strong organic carboxylic acids to conventional acrylate and/or methacrylate based adhesive compositions, the bonding characteristics thereof change dramatically.

Thermoplastic materials whose bondability is most dramatically enhanced by the compositions of the present invention are nylon and blends of nylon and nylon-like materials with other polymers.

Thermoset materials which exhibit dramatically enhanced bondability comprise homogeneous materials such as epoxies, and composite materials such as polyesters, urethanes, and/or epoxies, containing glass, minerals, and the like, which are polar or have hydrogen bonding capability.

The present invention thus utilizes acrylate and/or methacrylate based adhesive compositions as a base material. To this base material is added an effective amount of one or more strong organic carboxylic acids, e.g., acids having a relatively high dissociation constant ($K_d$ or $K_{ld}$). It has further been discovered that, the addition of water to these acids can increase their effectiveness, apparently through partial or enhanced solubility, which is believed to aid in the dissociation thereof.

9 Claims, No Drawings

ACID MODIFIED ADHESIVE COMPOSITION

This is a continuation of co-pending application Ser. No. 07/135,012 filed on Dec. 18, 1987, now abandoned, which is a division of copending application, Ser. No. 870,710, filed June 4, 1986, now U.S. Pat. No. 4,714,730.

BACKGROUND OF THE INVENTION

The present invention is directed to improved polymerizable acrylate and/or methacrylate based adhesive compositions, well suited for bonding typical plastic components, and especially well suited for the bonding of the so-called "difficult to bond" plastics (e.g., chemical-, environmental-, and solvent-resistant plastics) and like components.

Traditionally, the adhesive bonding of plastics has been a difficult task, requiring either a great deal of surface preparation and/or the use of highly specialized adhesive formulations. Such methods and compositions are described in U.S. Pat. No. 4,397,707 to Dawdy, U.S. Pat. No. 4,200,480 to Wolinski et al., U.S. Pat. No. 3,987,122 to Bartz et al., U.S. Pat. No. 3,962,498 to Owston, and U.S. Pat. No. 3,873,640 to Owston et al.

Polymerizable acrylate and/or methacrylate based adhesives generally exhibit good adhesion on unprimed non-crystalline thermoplastic materials. It is believed that this good adhesion results because the base monomer (such as methyl methacrylate) can solvate the plastic prior to hardening to provide the needed "bite" for strong bonds.

Many advanced thermoplastic materials that are either currently being used or have been considered for automotive structural applications are designed or have been modified for enhanced heat resistance, dimensional stability, environmental durability and chemical resistance (e.g., to gasoline, detergents, etc). Such designs and modifications often make these plastics inherently difficult to bond through the solvating effect which occurs with typical acrylate or methacrylate based adhesives.

Specifically, polyurethane and epoxy adhesives normally used in automotive bonding applications bond many of these materials only with the use of extensive pretreatment, if at all. Both of these adhesive classes require long cure times at ambient temperature and/or exposure to elevated temperatures to effect even handling strength. Systems designed for faster development of strength often have extremely short and impractical working life.

Thus, some alternative method of providing the necessary anchoring capability on the bonding surfaces of difficult plastic materials is necessary.

The present invention thus provides economical adhesive agents which provide surprisingly effective bonding for components which include solvent-resistant plastics and like materials.

In addition, the adhesive agents of the present invention either improve or maintain the ability to bond conventional plastic materials in comparison with conventional adhesives of this type.

SUMMARY OF THE INVENTION

The present invention is directed to improved acrylate and/or methacrylate adhesive compositions. Specifically, the improved adhesive compositions of the present invention, unlike their unimproved predecessor compositions, are able to bond certain solvent-resistant plastics and like materials as defined herein, with bond strengths preferably exceeding the deformation or breaking strength of the bonded materials themselves.

It has been discovered that by adding one or more strong organic carboxylic acids to conventional acrylate and/or methacrylate based adhesive compositions, the bonding characteristics thereof change dramatically.

It is believed that the addition of a strong organic acid to acrylate and/or methacrylate based adhesives acts to promote adhesion to solvent-resistant and/or heat-resistant plastics, and the like, due to interactions at the molecular level, e.g., through hydrogen bonding, and the like.

As used herein, the terms "solvent-resistant "chemical-resistant," "environmental-resistant," and "heat-resistant" are used when referring to plastics to describe those materials which in the past have been considered "difficult" (if not impossible) to bond with conventional acrylate or methacrylate based adhesive compositions. It is believed that this difficulty may be due to the inability of the acrylate and/or methacrylate monomers to solvate such plastics. Such materials generally have a polymeric structure or a like chemical make-up which makes them inherently resistant to the effect of solvents, heat, and other environmental agents. These materials also generally include within their structure, hydrogen bonding acceptor sites which are formed by electron rich atoms (e.g., N, O, or the like) or by similar electronegative groups. The main classes of these materials are the thermoplastics and thermosets.

Solvent-resistant thermoplastic materials whose bondability is most dramatically enhanced by the compositions of the present invention are generally polar and/or crystalline polymers or blends of such polymers and include nylon and blends of nylon and nylon-like materials with other polymers, such as polyimides and blends of polyimide with other polymers such as polyester.

Solvent-resistant thermoset materials which exhibit dramatically enhanced bondability with the adhesive compositions of the present invention generally comprise polar, solvent-resistant, materials, and include homogeneous materials such as epoxies and urethanes, and composite materials such as polyesters, urethanes, and/or epoxies, containing fillers such as glass, minerals, carbon, and the like. In the case of composite thermoset materials, either the base material (epoxy, urethane, polyester, etc.) or the filler (or both) may have the requisite hydrogen bonding capability, or other requisite adhesion promoting characteristics.

The present invention thus utilizes acrylate and/or methacrylate based adhesive compositions as a base material. To this base material is added an effective amount of one or more strong organic acids, i.e., acids having a relatively high dissociation constant ($K_d$). It has further been discovered that, the addition of water to compositions containing these acids can increase their effectiveness, apparently through partial or enhanced solubility, which is believed to aid in the dissociation thereof. These adhesive effects can further be enhanced by heat treatment of the bonds either during or after the bonding step (or both).

The amount of the strong organic acid to be added to the adhesive base composition varies with both the acid and the adhesive. Most of the strong organic acids used in the adhesive compositions of the present invention are water soluble, and thus many are insoluble in typical acrylate and/or methacrylate based adhesive formulations. The strong organic acids of the present invention can be used in mixtures with the standard adhesive acids, e.g., acrylic and/or methacrylic acid.

Typically the acid or mixture of acids is added to the adhesive formulation as a dispersion in an amount ranging from about 0.1 parts to 20 parts per hundred (pph), preferably from about 0.5 to 10 pph (based upon the weight of the formulation). Optionally, the acid can be dissolved in a sufficient amount of water and the mixture added to the adhesive. Those acids which are directly soluble in the adhesive base formulation may be added without prior solubilization.

As used herein, the term "strong organic acid" means that the acid is generally an organic carboxylic acid, e.g., R-COOH, (wherein R may be alkyl, aryl, aralkyl, and the like) so long as the relative "acid strength" of the organic acid is high. By definition, di- and polybasic acids as well as mixed acids are included within this definition.

To determine relative acid strength, one of two standards is employed herein:

The first standard makes use of the literature value for the dissociation constant ($K_d$) of the acid (at about 23° C., i.e., room temperature). To be useful herein, the $K_d$ value is generally within the range of from about $1 \times 10^{-4}$ to about $10 \times 10^{-1}$, preferably from about $1 \times 10^{-2}$ to about $1 \times 10^{-1}$. In the case of di- or polycarboxylic acids, the $K_d$ value used as a measure of the relative acid strength is the dissociation constant for the first acidic proton, i.e., $K_{1d}$.

The second standard for determining relative acid strength is generally applied to acids having no readily ascertainable $K_d$ value. Under this standard, the pH of an 0.2 N aqueous solution of the acid is measured. Such solutions of the acids useful in the present invention generally have pH values within the range of from about 1.2 to 2.3, preferably from about 1.3 to 2.0.

In the currently most preferred embodiments, the adhesive base formulation comprises (1) an acrylate-based or methacrylate-based ester monomer; (2) a catalyst; and either (3a) a chlorinated polyethylene polymer resin and sulfonyl chloride; or (3b) a chlorosulfonated polyethylene polymer resin; and (4) a graft copolymer resin having a backbone polymer with a glass transition temperature substantially below ambient temperature and a grafted polymer resin having a glass transition temperature substantially above ambient temperature.

DETAILED DESCRIPTION OF THE PREFERRED EMBODIMENTS

The present invention utilizes acrylate and/or methacrylate based adhesive compositions as a base material. To this base material is added an effective amount of one or more strong organic acids and optionally, an effective amount of water, either if necessary, or if desired, to effect dissolution of the acid or to enhance its effectiveness.

The present invention represents a dramatic discovery in that acrylate and/or methacrylate based adhesive formulations can be modified such that they will bond many solvent, chemical, and/or heat-resistant plastics.

While not wishing to be bound by theory, it is believed that the modified adhesive formulations of the present invention contain efficient hydrogen bonding donors which interact with what are perceived to be hydrogen bonding "acceptor" sites on the nylon and/or plastic polymer surfaces. Alternatively, or additionally, the modified adhesive formulations of the present invention may participate in a solvating-action with the materials being bonded, more effectively than previous adhesives.

The improvements noted with adhesive formulations modified in accord with the present invention are surprisingly greater than expected for the following reasons:

(1) The preferred strong organic acids useful herein are the strong organic - carboxylic acids. Many of these acids are substantially immiscible with conventional acrylate and/or methacrylate based adhesive compositions (in the absence of water) and are dispersed rather than intimately dissolved therein. It would be expected that little if any interaction between the acids and the adhesive formulation would result from such mixing.

(2) The adhesives modified in accordance with the present invention gave very strong bonds at room temperature on standard "as received" nylon which is believed to be a new accomplishment in this art. The conventional method of bonding nylon involves the use of phenol (or its derivatives) and requires heat to effect strong bonding.

(3) The modified adhesives of the present invention also provided strong bonds to low-profile fiberglass sheet molding compound (SMC) which has previously been difficult or impossible to bond using conventional acrylate/methacrylate adhesives.

As described above, the novel adhesive compositions of the present invention are especially useful for bonding solvent-resistant thermoplastics and thermosets. In addition to the nylon-6, nylon 6-6 and nylon 6-12 types of thermoplastics, the following table (I) lists additional commercially available thermoplastics and thermoplastic alloys, some of which contain nylon or nylon-like polymers that are bondable with the adhesive compositions of the present invention.

TABLE I

| Thermoplastic | Composition | Manufacturer |
|---|---|---|
| BEXLOY | amorphous nylon | Du Pont |
| ALCRYN | amorphous halogenated polyolefin thermoplastic elastomer | Du Pont |
| LOMOD | modified polyester elastomer | General Electric |
| NORYL GTX | nylon modified PPO (polyphenyleneoxide) | General Electric |
| ELEMID | nylon modified ABS | Borg-Warner |
| POCAN | modified polyester | Mobay |

Table II sets forth a number of commercially available thermoset materials which exhibit superior bonding performance with the adhesive compositions of the present invention.

TABLE II

| Thermoset/Composite | Composition | Manufacturer |
|---|---|---|
| Sheet molding compound (SMC)-low profile | polyester/glass | Ashland Chemical; Diversitech Chemical; Budd Co.; |

TABLE II-continued

| Thermoset/Composite | Composition | Manufacturer |
| --- | --- | --- |
| | | Premix; Owens-Corning Fiberglass; etc. |
| RIM Urethane (Reaction Injection Molded) | urethane/glass | Mobay; Dow; etc. |
| Epoxies | homogeneous | several |
| | epoxy/glass | several |
| | epoxy/graphite | several |
| | epoxy/Kelvar | several |

The materials listed in Tables I and II are by no means exclusive, but are intended only to demonstrate the range of materials bondable by the adhesive compositions of the present invention. For example, certain multiphase materials, such as ALCRYN from Du Pont, which is a proprietary, polar, solvent-resistant, modified halogenated polyolefin thermoplastic elastomer, are readily bonded by the adhesive compositions of the present invention.

When steel (or other metal) is bonded to any of the above-described plastics, it is often desirable to use a corrosion-resistant primer on the metal such as the commonly employed electrodeposited epoxy pretreatment known as "E" coat, manufactured and sold by the Pittsburgh Paint Glass (PPG) Company.

The present invention provides improved acrylic and/or methacrylic ester based adhesive compositions. General adhesive formulations based upon derivatives of acrylic acid and/or methacrylic acid are well known, but they do not have the bonding characteristics of the present adhesive compositions.

In one preferred embodiment of the present invention, the adhesive base formulation may be used either as a two-part system or as a system using a primer. In either case, the critical components of such a preferred composition comprise an effective amount of a solution of a sulfur - bearing composition selected from the group of chlorosulfonated polyethylene and a mixture of sulfonyl chloride with chlorinated polyethylene in a polymerizable vinyl monomer or a mixture of monomers and a polymerization catalyst.

Such an effective amount of the sulfur-bearing composition should contain from about 25 to 70 weight percent chlorine and from about 3 to 160 mmoles of sulfonyl chloride moiety per 100 grams of polymer and the polyethylene from which the chlorosulfonated or chlorinated polyethylene is prepared should have a melt index of from about 4 to 500. The solution can have a Brookfield viscosity of up to about 1 million. Materials such as these are described in Briggs et al., U.S. Pat. No. 3,890,407, the disclosure of which is incorporated herein by reference.

In another preferred embodiment of the present invention, the adhesive base formulation will comprise a polymer-in-monomer solution, an organic sulfonyl chloride species having up to 20 carbon atoms, and/or a chlorosulfonated polymer, a polymerization catalyst and an accelerator. The polymer of the polymer-in-monomer solution (as distinguished from any chlorosulfonated polymer) is present in an amount ranging from about 10 to 75 weight percent (based upon the weight of the entire solution, i.e., polymer, monomer, and organic sulfonyl chloride). The adhesive base formulation has a viscosity between about 2000 centipoise and about 1 million centipoise. The monomers employed in the base formulation are acrylic acid and/or methacrylic acid based esters. The organic sulfonyl chloride is present in an amount such that from about 3 to 160 mmoles of sulfonyl chloride groups are present per 100 grams of polymer. The polymerization catalyst is present in an amount of up to 15 percent by weight of the solution, and usually in an amount within the range of from about 0.2 to 5 percent by weight. Preferred polymerization catalysts for this base formulation include free radical generators such as organic peroxides, organic hydroperoxides and organic peresters. The accelerator (or activator) is present in an amount within the range of from about 0.01 to 10 percent by weight, preferably from about 0.1 to 5 weight percent. Materials such as these are described in Briggs et al., U.S. Pat. No. 4,182,644, the disclosure of which is incorporated herein by reference.

Acrylate and/or methacrylate monomers constitute the preferred principal reactants of the base adhesive formulation of the present invention. The preferred acrylate and/or methacrylate monomers comprise an acrylate-based or methacrylate-based material, such as an ester monomer. Such reactants are generally the reaction products of acrylic and/or methacrylic acids with one or more mono- or polybasic, substituted or unsubstituted, alkyl ($C_1$ to $C_{18}$), aryl, aralkyl, or heterocyclic alcohols. Preferably, the ester monomers are alkyl monomers, most preferably, $C_1$ to $C_4$ alkyl esters. In the case of heterocyclic esters, the preferred heteroatom is oxygen. When the alkyl ester contains more than about six carbon atoms, such esters are preferably used in blends with lower alkyl esters.

In the most preferred embodiments, the methacrylate-based ester monomer is selected from materials such as methyl methacrylate, ethyl methacrylate, butyl methacrylate, cyclohexyl methacrylate, 2-ethylhexyl methacrylate, and tetrahydrofurfuryl methacrylate. Still more preferably, the methacrylate-based ester monomer is selected from the group consisting of methyl methacrylate and ethyl methacrylate. Most preferably, the methacrylate-based ester monomer is methyl methacrylate. Adhesive compositions based upon these preferred monomers are described in Briggs, U.S. Pat. No. 4,536,546, the disclosure of which is incorporated herein by reference.

In certain instances it is desirable that the methacrylate-based ester monomer include an effective amount of an inhibitor for inhibiting or otherwise preventing polymerization of the ester monomer. For example, several of the preferred compositions of the present invention which include methyl methacrylate ester monomer, may also contain from about 10 to about 1500 parts per million (ppm) of hydroquinone or hydroquinone monomethyl ether in the ester monomer as such an inhibitor.

The preferred composition of the present invention further includes a catalyst. As used herein, the term "catalyst" means a free-radical generator. Free-radical generators include organic peroxides, organic hydroperoxides, peresters, and peracids. As is well known in the field of acrylate-based and methacrylate-based compositions, such a catalyst is used for triggering polymerization of acrylate-based and methacrylate-based monomers. Preferred catalysts in the composition of the present invention are cumene hydroperoxide and methyl ethyl ketone peroxide, both of which are known free-radical generators.

The most preferred composition of the present invention additionally includes either a chlorinated or a chlorosulfonated polyethylene polymer resin. Preferably, however, the composition includes chlorosulfonated polyethylene polymer, the resin which, in turn, preferably contains from about 25 to about 70 weight percent chlorine and from about 3 to about 160 millimoles of sulfonyl chloride moiety per 100 grams of polymer. A most preferred chlorosulfonated polyethylene polymer resin employed in the composition of the present invention is marketed under the trademark "HYPALON 30" and is commercially available from E. I. Du Pont de Nemours & Company of Wilmington, Del., 19898.

The preferred composition of the present invention also preferably includes a catalyst activator (or initiator). The most preferred initiators comprise condensation products of butyraldehyde and butylamine or aniline. Such condensation products, marketed under the trademarks 'VANAX 833" and "VANAX 808," respectively, are currently commercially available from the R. T. Vanderbilt Company, Inc., 230 Park Avenue, New York, NY 10017.

In addition to the preferred catalyst and catalyst activator components set forth above, other well known free radical generating moieties or combinations of peroxides and reducing agents (i.e., "redox" catalyst systems) may be used herein, provided that none of the added components interfere with the action of the strong organic acid (or vice versa). Such formulations are well known to those artisans skilled in the field of acrylate based adhesives.

The preferred composition of the present invention further includes a graft co-polymer resin. Such graft co-polymer resins have generally been found useful as physical property-modifiers of PVC, or other normally-rigid plastics or the like. See, for example, U.S. Pat. No. 3,845,164 to Goto et al., the disclosure of which is incorporated herein by reference.

Such physical property modifiers, moreover, have been found to increase flexibility and impact resistance of many normally-rigid plastics. In such a use, the graft co-polymer is generally a relatively small particle which, for example, can be dispersed throughout the normally-rigid plastic prior to the injection molding thereof.

The preferred graft co-polymers used in the preferred composition of the present invention provide improved spreading and flow properties to the uncured adhesive compositions. Such improved flow properties are highly desirable in certain adhesive applications. For example, when an adhesive is applied to an article by means of a syringe-type applicator, many commercially available adhesives undesirably form a "string" of adhesive which generally extends from a first point of the article (where the adhesive is applied) to a second point (a subsequent position of the applicator) spaced from the first point. The flow properties of the composition of the present invention are such that a relatively small droplet of such adhesive is topically applied to the point of application on the article to be bonded, with no adhesive string extending therefrom.

In the preferred composition of the present invention, it is believed that the methacrylate-based ester monomers polymerize and at least partially attach themselves to the chlorosulfonated polyethylene polymer resin backbone.

The preferred graft co-polymer resins used in the composition of the present invention are selected from the group consisting of acrylonitrile-butadine-styrene (ABS), methacrylate-butadiene-styrene (MBS), methacrylate-acrylonitrile-butadine-styrene (MABS), acrylate-styrene-acrylonitrile (ASA), all-acrylics, styrene-acrylonitrile grafted onto elastomeric backbones of ethylene-propylene-diene-monomer (SAEPDM), and methacrylic-acrylic rubber-styrene (MAS). The most preferred graft co-polymer resins are selected from the group consisting of MABS, ASA, all-acrylic and MBS.

The ABS graft co-polymer resin preferably has a styrene-butadiene rubber core and a styreneacrylonitrile shell.

The MBS graft co-polymer resin preferably has a styrene-butadine rubber core and a shell of acrylic polymer or co-polymer.

The MABS graft co-polymer resin preferably has a styrene-butadiene rubber core and a shell of methacrylate-acrylonitrile co-polymer. More preferably, the MABS graft co-polymer resin has a core, which is approximately 75% by weight of the total weight thereof, which consists of butadiene and styrene in the weight ratio of about 50 to 25, and a shell of methyl methacrylate and acrylonitrile in the weight ratio of about 20 to 5.

The preferred ASA graft co-polymer resin is substantially as disclosed in U.S. Pat. No. 3,944,631 to Yu et al., the disclosure of which is incorporated herein by reference. A most-preferred ASA graft co-polymer resin, marketed under the trademark "SCC 1015" (see Table III below), is substantially as described in the '631 patent and includes a crosslinked acrylate elastomer, a crosslinked styrene-acrylonitrile co-polymer and a linear styrene-acrylonitrile co-polymer. The most-preferred ASA graft co-polymer resin, moreover, appears morphologically to be made of interpenetrating polymer networks.

Preferred all-acrylic graft co-polymer resins are as disclosed in U.S. Pat. No. 3,985,703 to Ferry et al., the disclosure of which is incorporated herein by reference. Most-preferred all-acrylic graft co-polymer resins, marketed under the Trademarks "KM 323 B" and "KM 330" (see Table III below), have a rubber-type core which is approximately 75% of the total weight thereof, which consists of butyl methacrylate-type monomers and a shell of methyl methacrylate.

The following table (III) lists manufacturers (past and present) and trademarks of the preferred and most-preferred graft co-polymer resins, discussed hereinabove. The commercial availability of these materials from their original maker is by no means guaranteed by virtue of this listing. As the skilled artisan is well aware, alternate sources and equivalent materials are constantly being formulated by competitors in the polymer resin field.

TABLE III

| Type of Graft Co-polymer Resin | Trademark | Manufacturer |
|---|---|---|
| ABS | ABSON 120 | Mobay Chemical Co. Penn Lincoln Parkway West Pittsburgh, PA 15205 |
|  | ABSON 161 | Mobay Chemical Co. Penn Lincoln Parkway, West Pittsburgh, PA 15205 |
|  | ABSON 171 | Mobay Chemical Co. Penn Lincoln Parkway, West |

TABLE III-continued

| Type of Graft Co-polymer Resin | Trademark | Manufacturer |
|---|---|---|
| | XP90030.01 | Pittsburgh, PA 15205<br>The Dow Chemical Co.<br>Midland, MI 48640 |
| | XP74027.00 | The Dow Chemical Co.<br>Midland, MI 48640 |
| MBS | KM 611 | Rohm & Haas Co.<br>Independence Mall West<br>Philadelphia, PA 19105 |
| | KM 608A | Rohm & Haas Co.<br>Independence Mall West<br>Philadelphia, PA 19105 |
| | KM 653 | Rohm & Haas Co.<br>Independence Mall West<br>Philadelphia, PA 19105 |
| MBS | KM 641 | Rohm & Haas Co.<br>Independence Mall West<br>Philadelphia, PA 19105 |
| | KM BTA-IIIS | Rohm & Haas Co.<br>Independence Mall West<br>Philadelphia, PA 19105 |
| | KM BTA-IIIF | Rohm & Haas Co.<br>Independence Mall West<br>Philadelphia, PA 19105 |
| MABS | ACRYLOID KM 452 | Rohm & Haas Co.<br>Independence Mall West<br>Philadelphia, PA 19105 |
| | BLENDEX 452 | Borg-Warner Chemicals, Inc.<br>Technical Centre<br>Washington, WV 26181 |
| ASA | SCC 1015 | Stauffer Chemical Co.<br>299 Park Avenue<br>New York, NY 10017 |
| ALL-ACRYLIC | KM 323B | Rohm & Haas Co.<br>Independence Mall West<br>Philadelphia, PA 19105 |
| | KM 330 | Rohm & Haas Co.<br>Independence Mall West<br>Philadelphia, PA 19105 |
| SA-EPDM | ROVEL | Uniroyal Chemical<br>Division of Uniroyal, Inc.<br>Naugatuck, CT 06770 |
| MAS | VITAX | Hitachi, Ltd.<br>Tokyo, Japan |

The present invention will be further illustrated by reference to the following examples which are intended to aid in the understanding of the invention but which are not to be construed as limitations thereof. All parts, proportions and percentages reported herein, unless otherwise specified, are by weight. All temperatures are expressed in degrees Celsius (°C.).

GENERAL EXPERIMENTAL PROCEDURE

Unless indicated otherwise, preferred adhesive compositions were prepared by combining two separate (i.e., distinct) mixtures of methyl methacrylate ester monomer. One of the two monomer mixtures contained a chlorosulfonated polyethylene resin plus graft copolymer resins. The other of the monomer mixtures contained a graft co-polymer resin.

Adhesive base solutions for examples 1-38 were prepared as follows:

A forty percent solution of HYPALON 30 chlorsulfonated polyethylene in methyl methacrylate monomer (MMA) was prepared by rolling 1200 g of the polymer and 1800 g of MMA in a glass jar for two days.

The granular insoluble acids and derivatives thereof, used in Examples 1 through 31 were ground to a fine paste in methyl methacrylate monomer by rolling for two days at high speed 37.5 parts by weight (pbw) of acid and 62.5 pbw of MMA in a two ounce glass jar containing 4-8 glass spheres approximately 1.67 cm (0.66 in.) in diameter. The liquid or soluble acids or derivatives of Examples 32 through 38 were mixed in the monomer as received.

Adhesive test solutions were made by combining 20.07 pbw of MMA monomer, 60.20 pbw of the 40 percent solution of HYPALON 30 in MMA, 0.25 pbw of NAUGARD SCC BHT (butylated hydroxy toluene stabilizer) and sufficient acid or derivative to provide 0.116 moles of carboxylic acid functionality per 100 pbw of adhesive. After mixing these ingredients thoroughly with a spatula, 12.46 pbw of ACRYLOID KM 452 resin were added and thoroughly dispersed using a laboratory "Hochmeyer" high speed disperser. The solutions were allowed to stand for one day in order to solvate the ACRYLOID resin and remixed with the Hochmeyer mixer. Cumene hydroperoxide (0.5 pbw) was added followed by a brief final agitation with the Hochmeyer mixer.

The activator solution for Examples 1 through 38 was prepared by combining 72.5 pbw of MMA, 10.0 pbw of Stauffer SCC 1015 resin and 10.0 pbw of ACRYLOID KM 330 and mixing thoroughly with a spatula and then with the Hochmeyer mixer. The mixture was allowed to stand overnight to solvate the resins followed by mixing with the Hochmeyer mixer. Then 7.5 pbw of VANAX 808 was added and the solution was again mixed thoroughly with the Hochmeyer mixer.

Adhesive bonds were prepared by mixing equal parts of each test adhesive base with the above activator solution until the color was uniform indicating a thorough mix.

Bond samples for compressive shear testing (per ASTM D 905) were prepared from 0.635 cm × 2.54 cm × 2.54 cm (0.25 in. × 1 in. × 1 in.) and 0.635 cm × 2.54 cm × 5.08 cm (0.25 in. × 1 in. × 2 in.) pieces of nylon 6-6 bonded such that approximately 0.635 cm (0.25 in.) of overhang and 1.9 cm (0.75 in.) of overhang resulted at the top and bottom of the assembled test piece. Adhesive was applied to the center of the bonded area of the 5.08 cm (2 in.) test piece and a 1.27 cm × 0.051 cm (0.5 in. × 0.010 in.) wire ring spacer was placed in the center. The 2.54 cm (1 in.) test piece was aligned and pressed over the bonded area to squeeze the adhesive out of the perimeter on all sides to ensure complete coverage. Spring clamps were used to secure the bond during the curing process.

The bonded assemblies were allowed to set at ambient temperature (about 23° C.) for 30 minutes. Half of the bonded assemblies were placed in a constant temperature chamber at 23° C. ±0.5° C. for two days prior to testing. The remaining bonded assemblies were placed in an oven at about 121° C. for 60 minutes and then allowed to stand at ambient temperature for two days prior to testing.

Bond samples for lap shear testing per ASTM D1002 were prepared from 2.54 cm × 114.3 cm × 0.318 cm (1 in. × 4 in. × 0.125 in.) coupons of Noryl GTX. The bonded areas of the coupons were scrubbed with an abrasive nylon ("Scotchbrite") pad soaked with isopropanol followed by wiping with a tissue soaked with fresh isopropanol. The bonds were assembled as above using the wire ring spacers, with an overlap of 1.27 cm (0.5 in.) and clamped during the curing process.

The following bond test results are the average of three individual specimens tested on an Instron tensile tester at 23° C. The compressive shear bonds with nylon 6-6 were tested at a crosshead speed of 0.127 cm (0.05 in.) per minute and the lap shear bonds with Noryl GTX were tested at 1.27 cm (0.5 in.) per minute.

As a guide to the effectiveness of the present adhesive compositions, the following examples report a number of additive materials, some of which improved the adhesive, some of which did not.

To determine which of the tested additive materials (organic acids or derivatives) promoted the bondability of the adhesive formulation, the following represent illustrative values for the purposes of the present disclosure:

(a) a minimum bond strength (in psi) of about 500;
(b) preferably a bond strength (in psi) of at least about 750;
(c) more preferably a bond strength (in psi) of at least about 1000; and
(d) most preferably a bond strength (in psi) of at least about 2000.

It should be noted that bond strengths vary depending upon the materials being bonded (here, Nylon 6-6 and NORYL GTX), the cure temperature, e.g., heat curing (about 121° C.) versus room temperature (R.T., from about 23° C. to 26° C.), and in some cases, with the presence or absence of added water. From the examples which follow, the skilled artisan will be able to readily determine those additive materials and/or conditions best suited for any particular application.

EXAMPLES 1-6

Examples 1-6 illustrate the enhanced bonding capability of adhesives containing the preferred acids of this invention relative to adhesives containing no carboxylic acid and the acrylic and methacrylic acids conventionally used in adhesives of this type.

| | EXAMPLES 1-3 | | |
|---|---|---|---|
| Example | 1 | 2 | 3 |
| Acid or derivative | none (control) | acrylic (control) | methacrylic (control) |
| Soluble or insoluble (S or I) | — | S | S |
| Nylon 6-6 compressive shear strength (psi) | | | |
| R.T. cure | 90 | 480 | 610 |
| heat cure | 200 | 650 | 300 |
| NORYL GTX lap shear strength (psi) | | | |
| R.T. cure | 450 | 570 | 510 |
| heat cure | 280 | 730 | 580 |
| Acid strength of additive $K_d$ or $K_{1d}$ | n.a.* | $5.6 \times 10^{-5}$ | $2.2 \times 10^{-5}$ |
| pH of 0.2N aqueous solution at 25° C. | n.a. | 2.4 | 2.9 |

*- n.a. - not applicable or data not available

| | EXAMPLES 4-6 | | |
|---|---|---|---|
| Example | 4 | 5 | 6 |
| Acid or derivative | maleic | oxalic | malonic |
| Soluble or insoluble (S or I) | I | I | I |
| Nylon 6-6 compressive shear strength (psi) | | | |
| R.T. cure | 2250 | 1450 | 1670 |
| heat cure | 3225 | 1110 | 1450 |
| NORYL GTX lap shear strength (psi) | | | |
| R.T. cure | 550 | 220 | 560 |
| heat cure | 1700 | 1080 | 1030 |
| Acid strength $K_d$ or $K_{1d}$ | $1.4 \times 10^{-2}$ | $5.9 \times 10^{-2}$ | $1.5 \times 10^{-3}$ |
| pH of 0.2N aqueous solution at 25° C. | 1.6 | 1.4 | 1.9 |

EXAMPLES 7-12

Examples 7 through 12 illustrate the effectiveness of carboxylic acids which are structurally related to maleic acid and vary in geometrical isomerism and substituent groups about the central carbon-carbon double bond.

| | EXAMPLES 7-9 | | |
|---|---|---|---|
| Example | 7 | 8 | 9 |
| Acid or derivative | maleic (control) | fumaric | acetylene dicarboxylic |
| Soluble or insoluble (S or I) | I | I | I |
| Nylon 6-6 compressive shear strength (psi) | | | |
| R.T. cure | 2250 | 100 | 2160 |
| heat cure | 3225 | 250 | 1820 |
| NORYL GTX lap shear strength (psi) | | | |
| R.T. cure | 550 | 150 | 140 |
| heat cure | 1700 | 410 | 1870 |
| Acid strength $K_d$ or $K_{1d}$ | $1.4 \times 10^{-2}$ | $9.3 \times 10^{-4}$ | n.a. |
| pH of 0.2N aqueous solution at 25° C. | 1.6 | 2.0 @ 52° C. | 1.8 |

| | EXAMPLES 10-12 | | |
|---|---|---|---|
| Example | 10 | 11 | 12 |
| Acid or derivative | dibromo maleic | citraconic (cis) | mesaconic (trans) |
| Soluble or insoluble (S or I) | S | I | I |
| Nylon 6-6 compressive shear strength (psi) | | | |
| R.T. cure | 440 | 410 | 1420 |
| heat cure | 390 | 270 | 300 |
| NORYL GTX lap shear strength (psi) | | | |
| R.T. cure | 370 | n.t.** | 360 |
| heat cure | 390 | n.t. | 480 |
| Acid strength | n.a. | n.a. | $8.2 \times 10^{-4}$ |

EXAMPLES 10-12 (continued)

| Example | 10 | 11 | 12 |
|---|---|---|---|
| $K_d$ or $K_{1d}$ pH of 0.2N aqueous solution at 25° C. | n.a. | 2.2 | n.a. |

**- n.t. - not tested.

EXAMPLES 13-15

| Example | 13 | 14 | 15 |
|---|---|---|---|
| Acid or derivative | cis-aconitic | trans-aconitic | trans-traumatic |
| Soluble or insoluble (S or I) | I | I | I |
| Nylon 6-6 compressive shear strength (psi) | | | |
| R.T. cure | 3280 | 800 | 390 |
| heat cure | 1130 | 765 | 900 |
| NORYL GTX lap shear strength (psi) | | | |
| R.T. cure | 360 | 340 | n.t. |
| heat cure | 480 | 670 | n.t. |
| Acid strength $K_d$ or $K_{1d}$ | | | |
| pH of 0.2N aqeous solution at 25° C. | 1.6 | 1.9 | n.a. |

EXAMPLES 16-17

| Example | 16 | 17 |
|---|---|---|
| Acid or derivative | mono-butyl maleate | dioctyl maleate |
| Soluble or insoluble (S or I) | S | S |
| Nylon 6-6 compressive shear strength (psi) | | |
| R.T. cure | 30 | 30 |
| heat cure | 220 | 140 |
| NORYL GTX lap shear strength (psi) | | |
| R.T. cure | | |
| heat cure | | |
| Acid strength of additive $K_d$ or $K_{1d}$ | n.a. | n.a. |
| pH of 0.2N aqueous solution at 25° C. | n.a. | n.a. |

EXAMPLES 18-23

Examples 18 through 23 illustrate the effectiveness of dicarboxylic acids with varying chain lengths and degrees of unsaturation separating the acid groups.

EXAMPLES 18-20

| Example | 18 | 19 | 20 |
|---|---|---|---|
| Acid or derivative | maleic (control) | itaconic | succinic |
| Soluble or insoluble (S or I) | I | I | I |
| Nylon 6-6 compressive shear strength (psi) | 2250 | 440 | 30 |
| R.T. cure | 2250 | 440 | 30 |
| heat cure | 3225 | 520 | 0 |
| NORYL GTX lap shear strength (psi) | | | |
| R.T. cure | 550 | 380 | n.t. |
| heat cure | 1700 | 640 | n.t. |
| Acid strength $K_d$ or $K_{1d}$ | $1.4 \times 10^{-2}$ | $1.4 \times 10^{-4}$ | $6.2 \times 10^{-5}$ |
| pH of 0.2N aqueous solution at 25° C. | 1.6 | n.a. | n.a. |

EXAMPLES 21-23

| Example | 21 | 22 | 23 |
|---|---|---|---|
| Acid or derivative | trans,trans muconic | trans-β hydromuconic | glutaconic |
| Soluble or insoluble (S or I) | I | I | I |
| Nylon 6-6 compressive shear strength (psi) | | | |
| R.T. cure | 70 | 640 | 20 |
| heat cure | 340 | 2080 | 30 |
| NORYL GTX lap shear strength (psi) | | | |
| R.T. cure | 110 | n.t | n.t. |
| heat cure | 380 | n.t. | n.t. |
| Acid strength $K_d$ or $K_{1d}$ | n.a. | n.a. | $1.2 \times 10^{-4}$ |
| pH of 0.2N aqueous solution at 25° C. | n.a. | n.a. | n.a. |

EXAMPLES 24-25

| Example | 24 | 25 |
|---|---|---|
| Acid or derivative | sebacic | acetone dicarboxylic |
| Soluble or insoluble (S or I) | I | I |
| Nylon 6-6 compressive shear strength (psi) | | |
| R.T. cure | 380 | 380 |
| heat cure | 640 | 400 |
| NORYL GTX lap shear strength (psi) | | |
| R.T. cure | 360 | 310 |
| heat cure | 390 | 370 |
| Acid strength $K_d$ or $K_{1d}$ | n.a. | n.a. |
| pH of 0.2N aqueous solution at 25° C. | n.a. | 2.0 |

EXAMPLES 26-31

Examples 26-31 illustrate the effectiveness of acids and their derivatives with significant variation from maleic acid but with somewhat related structures.

| EXAMPLES 26-28 | | | |
|---|---|---|---|
| Example | 26 | 27 | 28 |
| Acid or derivative | maleic (control) | maleic anhydride | phthalic |
| Soluble or insoluble (S or I) | I | S | I |
| Nylon 6-6 compressive shear strength (psi) | | | |
| R.T. cure | 2250 | 840 | 80 |
| heat cure | 3225 | 180 | 150 |
| NORYL GTX lap shear strength (psi) | | | |
| R.T. cure | 550 | 0 | 310 |
| heat cure | 1700 | 420 | 420 |
| Acid strength $K_d$ or $K_{1d}$ | $1.4 \times 10^{-2}$ | n.a. | $1.1 \times 10^{-5}$ |
| pH of 0.2N aqueous solution at 25° C. | 1.6 | n.a. | n.a. |

| EXAMPLES 29-31 | | | |
|---|---|---|---|
| Example | 29 | 30 | 31 |
| Acid or derivative | N-ethyl maleamic | N-ethyl maleimide | cis-5-norbornene endo-2,3-dicarboxylic acid |
| Soluble or insoluble (S or I) | I | I | I |
| Nylon 6-6 compressive (psi) | | | |
| R.T. cure | 130 | 100 | 550 |
| heat cure | 440 | 260 | 990 |
| NORYL GTX lap shear strength (psi) | | | |
| R.T. cure | 300 | 310 | 460 |
| heat cure | 390 | 450 | 670 |
| Acid strength $K_d$ or $K_{1d}$ | n.a. | n.a. | n.a. |
| pH of 0.2N aqueous solution at 25° C. | 2.4 | n.a. | n.a. |

EXAMPLES 32-38

Examples 32-38 illustrate the effectiveness of soluble organic carboxylic acids of varying strength in the adhesive formulations of the present invention.

| EXAMPLES 32-34 | | | |
|---|---|---|---|
| Example | 32 | 33 | 34 |
| Acid or derivative | acetic | iodo-acetic | chloro-acetic |
| Soluble or insoluble (S or I) | S | S | S |
| Nylon 6-6 compressive shear strength (psi) | | | |
| R.T. cure | 60 | 210 | 600 |
| heat cure | 50 | 100 | 770 |
| Acid strength $K_d$ or $K_{1d}$ | $1.8 \times 10^{-5}$ | $7.2 \times 10^{-4}$ | $1.5 \times 10^{-3}$ |

| EXAMPLES 35-37 | | | |
|---|---|---|---|
| Example | 35 | 36 | 37 |
| Acid or derivative | dichloro-acetic | trichloro-acetic | difluoro-acetic |
| Soluble or insoluble (S or I) | S | S | S |
| Nylon 6-6 compressive shear strength (psi) | | | |
| R.T. cure | 2520 | 2770 | 2530 |
| heat cure | 2880 | 1000 | 2100 |
| Acid strength $K_d$ or $K_{1d}$ | $4.3 \times 10^{-2}$ | $2.2 \times 10^{-1}$ | n.a. |

| EXAMPLE 38 | |
|---|---|
| Acid or derivative | trifluoro-acetic |
| Soluble or insoluble (S or I) | S |
| Nylon 6-6 compressive shear strength (psi) | |
| R.T. cure | 1240 |
| heat cure | 2330 |
| Acid strength $K_d$ or $K_{1d}$ | $5.8 \times 10^{-1}$ |

EXAMPLES 39-48

Examples 39-48 illustrate the effectiveness of added water in increasing the effective bond strength of the strong organic acid (or derivative) containing adhesive compositions of the present invention. The adhesive bases for these examples were prepared essentially as those for the previous examples except that examples 40, 42, 44, 46 and 48 were prepared by adding 3 percent (by weight) water to the adhesive compositions of examples 39, 41, 43, 45, and 47 respectively followed by mixing with the Hochmeyer for 1 to 2 minutes.

| EXAMPLES 39-40 | | |
|---|---|---|
| Example | 39 | 40 |
| Acid or derivative | maleic | maleic plus 3% H$_2$O |
| Soluble or Insoluble (S or I) | I | I |
| Nylon 6-6 compressive shear strength (psi) | | |
| R.T. cure | 1410 | 3500 |
| heat cure | 990 | 4000 |
| Acid strength $K_d$ or $K_{1d}$ | $1.14 \times 10^{-2}$ | |

| EXAMPLES 41-42 | | |
|---|---|---|
| Example | 41 | 42 |
| Acid or derivative | oxalic | oxalic 3% H$_2$O |
| Soluble or insoluble (S or I) | I | I |
| Nylon 6-6 | | |

EXAMPLES 41-42

| Example | 41 | 42 |
|---|---|---|
| compressive shear strength (psi) | | |
| R.T. cure | 1450 | 680 |
| heat cure | 1110 | 1260 |
| Acid strength $K_d$ or $K_{1d}$ | 5.4 × 10⁻² | |

EXAMPLES 43-44

| Example | 43 | 44 |
|---|---|---|
| Acid or derivative | malonic | malonic 3% H₂O |
| Soluble or insoluble (S or I) | I | I |
| Nylon 6-6 compressive shear strength (psi) | | |
| R.T. cure | 940 | 1290 |
| heat cure | 870 | 1210 |
| Acid strength $K_d$ or $K_{1d}$ | 1.6 × 10⁻³ | |

EXAMPLES 45-46

| Example | 45 | 46 |
|---|---|---|
| Acid or derivative | mesaconic | mesaconic 3% H₂O |
| Soluble or insoluble (S or I) | I | I |
| Nylon 6-6 compressive shear strength (psi) | | |
| R.T. cure | 420 | 1710 |
| heat cure | 490 | 3280 |
| Acid strength $K_d$ or $K_{1d}$ | 8.2 × 10⁻⁴ | |

EXAMPLE 47-48

| Example | 47 | 48 |
|---|---|---|
| Acid or derivative | monomethyl ester of maleic acid | monomethyl ester of maleic acid plus 3% H₂O |
| Soluble or insoluble (S or I) | S | S |
| Nylon 6-6 compressive shear strength (psi) | | |
| R.T. cure | 130 | 2980 |
| heat cure | 660 | 3280 |
| pH of 0.2N aqueous solution at 25° C. | 2.3 | |

EXAMPLES 49-54

The adhesives for Examples 49-54 were prepared by combining 89 parts of the appropriate polymer/methyl methacrylate solution, the appropriate acid, 0.5 parts cumene hydroperoxide, 0.25 parts BHT, and in the case of Examples 53 and 54, 0.15 parts diphenylether disulfonyl chloride. The ingredients were mixed together by hand until uniform. The specific ingredients and amounts for these examples are as follows:

| Ingredients | Example No./Amount (pbw) | | | | | |
|---|---|---|---|---|---|---|
| | 49 | 50 | 51 | 52 | 53 | 54 |
| 40% HYPALON 30/MMA | 89 | 89 | 0 | 0 | 0 | 0 |
| 40% HYPALON 20/MMA | 0 | 0 | 89 | 89 | 0 | 0 |
| 40% VAMAC G/MMA | 0 | 0 | 0 | 0 | 89 | 89 |
| Methacrylic acid | 10 | 0 | 10 | 0 | 10 | 0 |
| Cumene hydroperoxide | 0.5 | 0.5 | 0.5 | 0.5 | 0.5 | 0.5 |
| Butylated hydroxy toluene (BHT) | 0.25 | 0.25 | 0.25 | 0.25 | 0.25 | 0.25 |
| 37.5% maleic acid/ MMA paste | 0 | 17.87 | 0 | 17.87 | 0 | 17.87 |
| Diphenyl ether disulfonyl chloride | 0 | 0 | 0 | 0 | 0.15 | 0.15 |

The activator solution for Examples 49-54 was prepared as follows:

A solution of 3.85 parts Union Carbide VYNS vinyl resin and 76.9 parts methyl ethyl ketone was prepared by rolling the ingredients in a glass jar for 1 day. To this solution was added 19.23 parts VANOX 808 and 0.000008 parts copper acetylacetonate followed by mixing by hand with a spatula.

Sample Preparation

A thin coat of activator was applied to both surfaces of the nylon being bonded. The adhesive formulation was placed on top of the activator and a ring of 10 mil wire was placed in the bond to control thickness. The two pieces of nylon were assembled, cured and tested as described in Examples 1-38.

Examples 49-54 illustrate the results of adding the most preferred organic acid, maleic acid in effecting improved bond strength with surface cured adhesives based upon various polymers such as those described in U.S. Pat. Nos. 3,890,407 and 4,112,013 using a surface applied activator. The disclosures of these patents are incorporated herein by reference.

EXAMPLES 49-51

| Example | 49 | 50 | 51 |
|---|---|---|---|
| Polymer | Hypalon 30 | Hypalon 30 | Hypalon 20 |
| Acid | methacrylic | maleic | methacrylic |
| Nylon 6-6 compressive shear strength (psi) | | | |
| No added water: | | | |
| R.T. cure | 620 | 450 | 540 |
| heat cure | 290 | 1460 | 400 |
| With 3% added water: | | | |
| R.T. cure | 920 | 2650 | 410 |
| heat cure | 1400 | 3030 | 910 |

EXAMPLES 52-54

| Example | 52 | 53 | 54 |
|---|---|---|---|
| Polymer | Hypalon 20 | Vamac G E/A⁺ | Vamac G E/A⁺ |
| Acid | maleic | methacrylic | maleic |
| Nylon 6-6 compressive shear strength | | | |

EXAMPLES 52-54 -continued

| Example | 52 | 53 | 54 |
|---|---|---|---|
| (psi) | | | |
| No added water: | | | |
| R.T. cure | 170 | 420 | 320 |
| heat cure | 1360 | 440 | 420 |
| With 3% added water: | | | |
| R.T. cure | 540 | 610 | 480 |
| heat cure | 630 | 1025 | 480 |

+E/A-Ethylene/acrylate copolymer

EXAMPLES 55-61

Examples 55-61 illustrate the effectiveness of the preferred acid of the present invention (maleic) in adhesive formulations prepared from a variety of polymer types, individually and in combination.

For these examples, the following adhesive and activator solutions were prepared by rolling each of the polymers in their respective monomer solutions until dissolution was complete. The remaining additives were added and stirred or rolled until uniform mixtures were obtained. The maleic acid was added as an 11.2 percent ball milled paste in MMA monomer and the monomer level was adjusted to provide the proportions indicated.

| ADHESIVES | A | B | C | D | E |
|---|---|---|---|---|---|
| HYPALON 30 | 40 | — | — | — | — |
| ELVACITE 2009 | — | 45 | — | — | — |
| VAMAC G | — | — | 25 | — | — |
| ABS molding resin | — | — | — | 25 | — |
| VYNS resin | — | — | — | — | 11 |
| MMA monomer | 59 | 54 | 74 | 74 | 88 |
| DPESC | — | 0.5 | 0.5 | 0.5 | 0.5 |
| Cumene hydroperoxide | 1.0 | 1.0 | 1.0 | 1.0 | 1.0 |
| ACID | 10 parts methacrylic acid (MMA) or 6.7 parts maleic acid (MA) as indicated in the Examples | | | | |

| ACTIVATORS | 1 | 2 | 3 | 4 |
|---|---|---|---|---|
| ELVACITE 2009 | 40 | — | — | — |
| VAMAC G | — | 25 | — | — |
| ABS molding resin | — | — | 25 | — |
| VYNS resin | — | — | — | 10 |
| MMA monomer | 50 | 65 | 65 | 80 |
| VANAX 808 | 10 | 10 | 10 | 10 |

EXAMPLES 55-56

| Example | 55 | | 56 | |
|---|---|---|---|---|
| Solutions | A + 1 | | A + 2 | |
| Polymer types | CSPE/p-MMA | | CSPE/E/A+ | |
| Acid | MAA | MA | MAA | MA |
| Nylon 6-6*** compressive shear strength (psi) | | | | |
| R.T. cure | 565 | 960 | 930 | 1995 |
| heat cure | 415 | 1555 | 1120 | 2560 |

***bonds were shimmed to provide a bond thickness of 0.05 in. (1.27 mm).
+E/A-Ethylene-acrylate copolymer

EXAMPLES 57-58

| Example | 57 | | 58 | |
|---|---|---|---|---|
| Solutions | A + 3 | | B + 1 | |
| Polymer types | CSPE/ABS | | p-MMA/p-MMA | |
| Acid | MAA | MA | MAA | MA |
| Nylon 6-6*** compressive shear strength (psi) | | | | |
| R.T. cure | 630 | 1605 | 295 | 760 |
| heat cure | 810 | 2735 | 455 | 915 |

***bonds were shimmed to provide a bond thickness of 0.05 in. (1.27 mm).

EXAMPLES 59-61

| Example | 59 | | 60 | | 61 | |
|---|---|---|---|---|---|---|
| Solutions | C + 2 | | D + 3 | | E + 4 | |
| Polymer types | E/A+/E/A+ ABS/ABS | | Vinyl/Vinyl | | | |
| Acid | MAA | MA | MAA | MA | MAA | MA |
| Nylon 6-6*** compressive shear strength (psi) | | | | | | |
| R.T. cure | 835 | 2190 | 1050 | 1935 | 280 | 2400 |
| heat cure | 150 | 50 | 885 | 1425 | 295 | 1090 |

***bonds were shimmed to provide a bond thickness of 0.05 in. (1.27 mm).
+E/A-Ethylene-acrylate copolymer

EXAMPLES 62-66

The adhesives of these examples were prepared as in Examples 1-38 except that the maleic acid level was varied. The activator was the same as employed in Examples 1-38. The sample preparation and testing were also the same as in Examples 1-38.

EXAMPLES 62-64

| Example | 62 | 63 | 64 |
|---|---|---|---|
| Maleic acid percent by wt. | 0 | 0.05 | 0.5 |
| Nylon 6-6 compressive shear strength (psi) | | | |
| No added water: | | | |
| R.T. cure | 60 | 80 | 50 |
| heat cure | 90 | 110 | 250 |
| With 3% added water: | | | |
| R.T. cure | 150 | 180 | 320 |
| heat cure | 550 | 750 | 2100 |

EXAMPLES 65-66

| Example | 65 | 66 |
|---|---|---|
| Maleic acid percent by wt. | 6.7 | 16.0 |
| Nylon 6-6 compressive shear strength (psi) | | |
| No added water: | | |
| R.T. cure | 1600 | 1850 |
| heat cure | 1390 | 1050 |
| With 3% added water: | | |
| R.T. cure | 4100 | 1850 |
| heat cure | 2650 | 2700 |

EXAMPLE 69

The following example describes the repair of a section of standard fiberglass (e.g., boat, auto, snowmobile, etc.) using the adhesive formulation of the present invention to improve the strength of the repair site.

A. Adhesive/filler:

The adhesive used for this repair situation was prepared by combining 60.2 pbw of 40% HYPALON 30 in MMA, 20.07 pbw methyl methacrylate, 0.25 pbw NAUGUARD SCC, 6.67 pbw of a 60% maleic acid/methyl methacrylate paste (prepared as in the General Experimental Procedure), 5 pbw methacrylic acid and 12.46 pbw ACRYLOID KM 452. These ingredients were mixed thoroughly in a Hochmeyer mixer until uniform and allowed to stand at room temperature for one day. Then the mixture was again mixed in the Hochmeyer mixer followed by the addition of 0.5 pbw of cumene hydroperoxide and additional mixing. Finally, 10 pbw P. Q. Corp. Q-Cell 600 hollow glass spheres having a mean particle size of 62 microns were added and the adhesive was mixed by hand until uniform.

B. Activator:

The activator for this repair system was prepared by combining 76.31 pbw methyl methacrylate, 10.41 pbw ACRYLOID KM 330, and 9.63 pbw STAUFFER SCC 1015. These materials were mixed with the Hochmeyer mixer and allowed to stand at room temperature for 1 day. To this solution was next added 10 pbw of VANAX 808 and 0.00003 pbw copper acetlyacetonate, followed by mixing in the Hochmeyer mixer. Finally, 10 pbw P.Q. Corp. Q-Cell 600 hollow glass spheres were added and the mixture was stirred by hand until uniform.

C. Optional Primer:

While a primer may not be necessary with this repair system, the following primer was prepared and used in this example.

A solution of 3.85 pbw Union Carbide VYNS (vinyl resin) and 76.9 pbw methyl ethyl ketone (MEK) was prepared by rolling the ingredients in a glass jar for 1 day. To the resulting solution was added 19.23 pbw VANAX 808 and 0.000008 pbw copper aceteylacetonate. This solution was mixed by hand until uniform.

D. Repair Procedure:

The hole to be repaired was in a fiberglass auto fender and was approximately three inches in diameter. The surrounding two inches of fiberglass was sanded with No. 36 grit sandpaper using an air grinder. The area was then cleaned by wiping with a clean tissue soaked with isopropanol. A thin coat of primer was applied to the sanded area with a brush.

Approximately 50 g of adhesive and 50 kg of activator were mixed together by hand for one minute. A sufficient amount of this mixture was applied to one side of a 6 in.×6 in. piece of 2 oz. fiberglass mat to give a uniform coat. This "patch" was placed over the hole in the fiberglass on the interior side of the fender. The remaining mixture was applied to the opposite side of the fiberglass mat, coating the back side of the patch. The patch was allowed to cure for 30 minutes at room temperature.

Approximately 50 g of adhesive and 50 g of activator were then mixed and applied over the fiberglass mat from the exterior side of the fender. After 30 minutes cure, the excess adhesive from this side of the fender was removed with a rasp, followed by sanding the area with No. 36 grit sandpaper, then No. 100 grit sandpaper using an air grinder. The area was then boardsanded with No. 100 grit sandpaper.

To fill in scratches and rough areas, a coat of polyester-styrene based feather fill was applied over the repaired area. After hardening, the excess material was removed with a rasp, followed by boardsanding and finally sanding with a dual action air sander with No. 220 grit sandpaper.

A coat of solvent based grey primer surface was applied with an air spray gun. After drying, this was sanded with No. 200 and No. 400 grit sandpapers. The topcoat for this repaired fender consisted of four coats of SIKKENS black urethane paint applied with an air spray gun. After drying overnight the repaired area was buffed to give a very high gloss black finish with the repaired area being completely undetectable.

TABLE IV

| General Name | Trade Name or Synonyms | Manufacturer(s) |
|---|---|---|
| Polymers: | | |
| Chlorosulfonated polyethylene | HYPALON CSPE | Du Pont |
| Methacrylate-acrylonitrile butadiene styrene modifier resin | ACRYLOID KM452 MABS | Rohm & Haas |
| Methacrylate-butadiene styrene modifier resin | ACRYLOID KM753 MBS | Rohm & Haas |
| Acrylic modifier resin | ACRYLOID KM330 | Rohm & Haas |
| Acrylonitrile-styrene-acrylate modifier resin | SCC 1015 ASA | Stauffer |
| Ethylene/methacrylate copolymer | VAMAC | Du Pont |
| Poly (methyl-methacrylate) | ELVACITE 2009 p-MMA | Dow |
| Acrylonitrile-butadiene-styrene molding resin (natural) | ABS grade 500 | Dow |
| Vinyl chloride/vinyl acetate copolymer | BAKELITE VYNS | Union Carbide |
| Monomers: | | |
| Methylmethacrylate (10 ppm MEHQ inhibitor) | MMA | Du Pont & Rohm & Haas |
| Butylmethacrylate (10 ppm MEHQ inhibitor) | BMA | Du Pont & Rohm & Haas |
| 2-ethylhexyl methacrylate (10 ppm MEHQ inhibitor) | 2-EHMA | Du Pont |
| Tetrahydrofurfuryl methacrylate (120 ppm MEHQ inhibitor) | THFMA SR-203 | Arco Specialty Chemicals |
| Hydroxyethyl methacrylate (1200 ppm MEHQ inhibitor) | HEMA | Rohm & Haas |
| Methacrylic acid (250 ppm MEHQ inhibitor) | MAA | Rohm & Haas |
| Acrylic acid (220 ppm MEHQ inhibitor) | | Union Carbide Rohm & Haas |
| Activators & Stabilizers: | | |
| Cumene hydroperoxide (80%) | CHP | Hercules |
| Butyraldehyde-aniline R. T. reaction product | VANAX 808 | Vanderbilt |
| Butylated hydroxy | IONOL | Shell |

TABLE IV-continued

| General Name | Trade Name or Synonyms | Manufacturer(s) |
|---|---|---|
| toluene, 2,6-di-p-tertiarybutyl-p-cresol | NAUGARD SCC BHT | Uniroyal |

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed:

1. An adhesive composition comprising:
   (a) an acrylate or methacrylate ester monomer;
   (b) a polymerization catalyst;
   (c) a mixture of
      (A) one or more of the members of the group consisting of:
         (1) chlorinated polyethylene polymer resin and sulfonyl chloride;
         (2) chlorosulfonated polyethylene polymer resin; and
         (3) a polymer-in-monomer solution and (B) a graft co-polymer resin having a backbone polymer with a glass transition temperature substantially below ambient temperature and a grafted polymer resin having a glass transition temperature substantially above ambient temperature; and
   (d) an effective amount of strong organic acid wherein the acid has a dissociation constant ($K_d$ or $K_1d$) within the range of from about $1 \times 10^{-2}$ to about $10 \times 10^{-1}$ or wherein an 0.2 N aqueous solution of the acid has a pH in the range of from about 1.2 to 2.0 at 2.5° C.

2. The adhesive composition of claim 1 wherein the strong organic acid has a dissociation constant ($K_d$ or $K_{1d}$) within the range of from about $1 \times 10^{-2}$ to about $1 \times 10^{-1}$.

3. The adhesive composition of claim 1 wherein the strong organic acid has a dissociation constant ($K_1$ or $K_{1d}$) or about $1.4 \times 10^{-2}$.

4. The adhesive composition of claim 3 wherein the strong organic acid is maleic acid.

5. The adhesive composition of claim 1 wherein the strong organic acid is added to the adhesive formulation as a dispersion in an amount ranging from about 0.1 parts to 20 part per hundred.

6. The adhesive composition of claim 1 wherein the strong organic acid is added to the adhesive formulation as a dispersion in an amount ranging from about 0.5 to about 10 parts per hundred.

7. The adhesive composition of claim 1 wherein the strong organic acid is added to the adhesive formulation as an aqueous solution in an amount ranging from about 0.1 parts to 20 parts per hundred.

8. The adhesive composition of claim 1 wherein the strong organic acid is added to the adhesive formulation as an aqueous solution in an amount ranging from about 0.5 parts to 10 parts per hundred.

9. The adhesive composition of claim 1 wherein an 0.2 N aqueous solution of the strong organic acid has a pH in the range of from about 1.3 to 2.0.

* * * * *